Patented Aug. 23, 1938

2,127,782

UNITED STATES PATENT OFFICE 2,127,782

PROCESS FOR CANNING AND COOKING OATMEAL

Edgar R. McShane, Baltimore, Md.

No Drawing. Application October 20, 1937,
Serial No. 170,121

1 Claim. (Cl. 99—182)

My invention relates to a novel process of cooking or processing oatmeal or rolled oats in sealed metal containers, wherein the contents of each can receives an individual and more uniform cook than can be obtained, in mass production, under the old method of cooking in open jacketed kettles or double boilers. Commercially the product I intend to produce—ready cooked oatmeal—has only been heretofore once attempted insofar as I have been able to determine, and that attempt was made by the open-kettle method wherein the process is necessarily slow and expensive, with the ever present possibility of scorching the product and burning the equipment, due to the density of the mass produced when cooked down to its proper consistency. The almost inevitable destroying of batches of the product, as well as the constant necessity for replacing equipment due to burning hazards, adds too much to the cost of the product that may or may not turn out in a satisfactory manner. The open-kettle method of cooking also has a tendency to destroy some of the virtues of the product by reason of evaporation through steam created during cooking. The hazards and slowness of the method described tend to make the cost of the product too high to find favor with the greater portion of the consumers, and make merchandising of the article almost prohibitive in its competing field. The process which I have invented, however, for canning and cooking oatmeal, reduces the cost of production by such a large percentage that the product can be sold at retail for approximately half the price of the same article produced under the old slow uncertain and costly method. This lowering of costs and the production of a more uniform product, allow a greater number of consumers to enjoy the convenience of the form of food produced. The improved process will now be described.

Into each can, I place a definite predetermined weight of dry oatmeal or rolled oats and add sufficient hot water to provide for subsequent cooking to the proper consistency, the temperature of said water being sufficiently high to cause a vacuum in the can after the completion of the process, and cooling. A suitable quantity of salt may be mixed with the hot water before or after this water is run into the can. Similarly, sugar or the like may be mixed with said water either before or after placing it in the can. The contents of the can are hermetically sealed by sealing the latter in any of the known ways. The can is then immediately placed in agitation in a revolving pre-cooker which gently agitates the can and contents in order to cause the oatmeal to rapidly absorb the water. Thus, the individual pieces of the oatmeal are caused to revert toward natural shape before breaking down of the starch can occur, and moreover, a rapid penetration of heat through the entire contents of the can, is caused, preparing said contents for the final cooking and sterilizing step to be hereinafter described.

The agitating and pre-cooking operation consists of gently rolling the can and at intervals gently throwing the same to a new position, the can, during the agitation, being in dry heat for approximately half of the time and in boiling water the other half, alternately. The agitating and cooking step is carried on for approximately eleven minutes at a temperature of 212° F.

After the period of agitation and pre-cooking above described, the cans are immediately transferred to a cage or crate and placed in a retort in which still cooking is carried on at a temperature of 240° F. for approximately two hours. This is the final cook and it also performs a sterilization function. It results in the starch granules being completely gelatinized and the oatmeal will therefore be readily digested.

Upon completion of the final cook, the cans are placed in cold water until cool and upon cooling, a partial vacuum is formed for thorough preservation of the product.

Attention is invited to the fact that the agitating and pre-cooking operation accomplishes two things. First, it causes the pieces of oatmeal to rapidly absorb the water before any breaking down of the starches can occur, said pieces therefore reverting more nearly to natural shape than is otherwise possible. Second, a rapid penetration of heat to the entire contents of the can is insured so that the final cooking and sterilizing step can, without question, produce a uniformly cooked and sterilized product.

The reason for making use of still cooking for the final cook and sterilizing step, is that performing this final cook under agitation would be useless, for the product has become such a dense mass by the time the final cook is performed, that the gentle agitation readily carried out in the first stage of the process, would not take place.

By carrying out the novel process herein described, I have succeeded in producing an entirely successful product which can be produced with relatively small expense and consequently sold at a fair price, with a substantial margin of profit.

I claim:

A process for canning and cooking oatmeal or rolled oats, comprising the steps of placing dry oatmeal or rolled oats and hot water in a can, hermetically sealing the can, immediately agitating and pre-cooking for approximately eleven minutes at about 212° F. to cause the pieces of oatmeal to rapidly absorb the water and revert toward natural shape before breaking down of the starches can occur and to insure rapid penetration of heat through the entire can contents, and performing a final cooking and sterilizing operation for approximately two hours at about 240° F.

EDGAR R. McSHANE.